Aug. 6, 1935.  F. M. HARTFORD  2,010,261
MUFFLE KILN
Filed Dec. 22, 1933  2 Sheets-Sheet 1
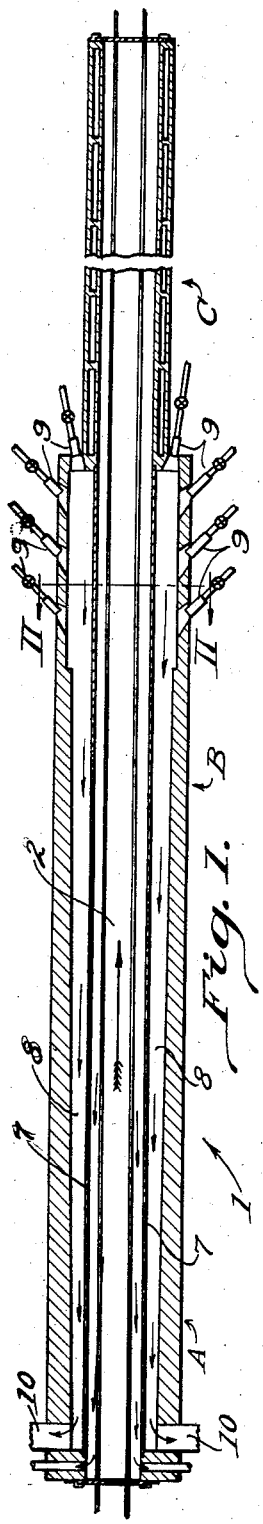
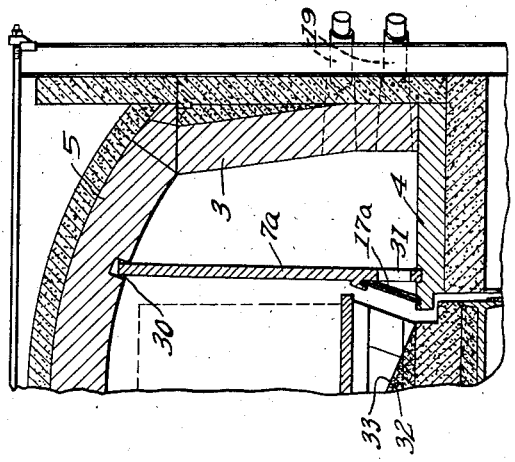
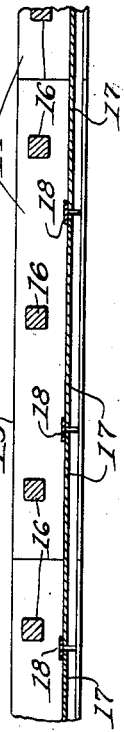
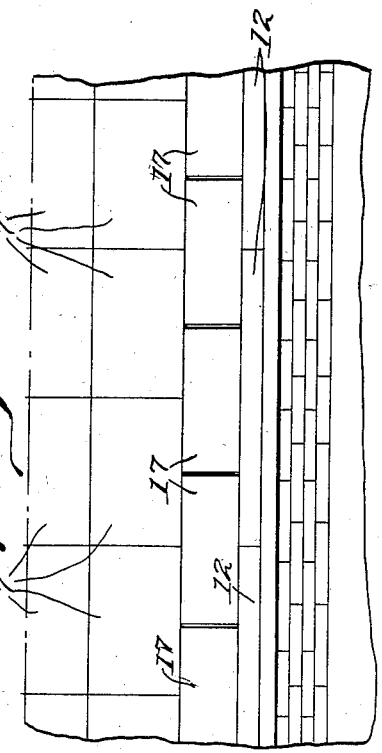
Inventor
Frank M. Hartford
By W. S. McDowell
Attorney

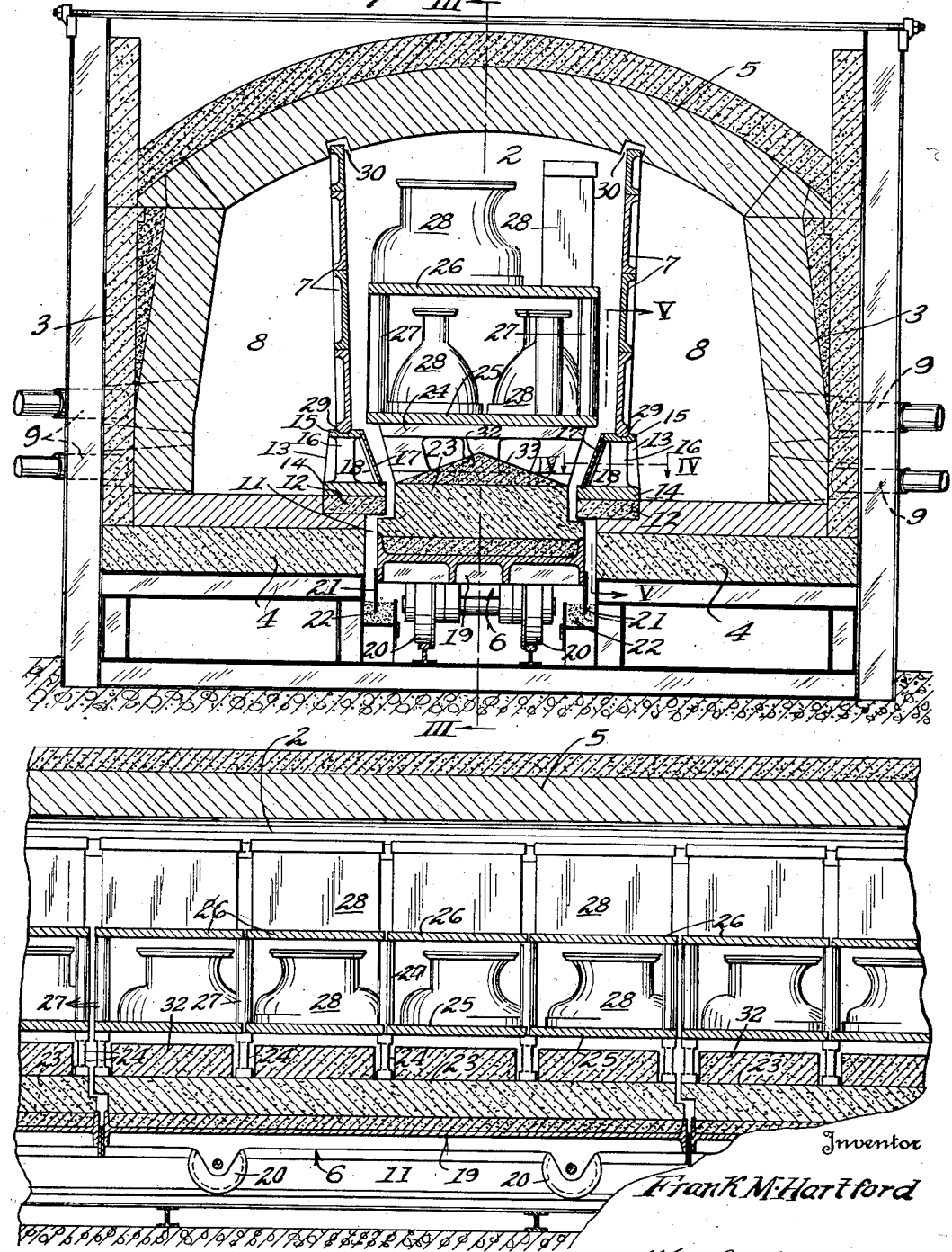

Patented Aug. 6, 1935

2,010,261

UNITED STATES PATENT OFFICE 2,010,261

MUFFLE KILN

Frank M. Hartford, Columbus, Ohio

Application December 22, 1933, Serial No. 703,586

12 Claims. (Cl. 25—144)

This invention relates to improvements in tunnel kilns and has particular reference to tunnel kilns wherein the combustion gases used in maintaining the operating temperatures of such kilns, may be substantially removed from direct contact with the ware undergoing heat treatment.

In the firing of certain ceramic products, as well as other heat treated products, it is often desirable that the combustion gases used in the heating of the kiln be kept out of direct contact with the ware, at least to a very appreciable extent. To this end, it is an object of the present invention to provide a tunnel kiln wherein baffle plates are used to separate that part of the tunnel through which the ware passes from the spaces on each side of the tunnel or kiln where combustion takes place or through which the products of combustion travel towards the charging end of the kiln. The result of this construction is that the heating of the ware may be accomplished largely by radiation of heat from the surface of these baffle plates onto the ware and without any substantial direct contact with the gases of combustion with the ware.

In the indirect fired type of continuous tunnel kiln, having a stationary fire zone and moving ware and in which the transfer of heat to the ware is effected largely by radiation, one of the outstanding objections thereto is found in the difficulty encountered in heating the lower center portion of the ware setting to as high a temperature as the outer and top portions of the setting. Especially is this true where the ware is being passed through such a kiln at a fairly rapid rate.

Where such a system of heat transfer by radiation to the ware is employed, there often results a cross sectional area in the ware setting, around the lower central part thereof, which possesses a lower temperature than the remainder of the setting. In order to obviate this area of lower temperature and more nearly heat the entire setting equally and uniformly, the present invention has for its primary object to provide an improved arrangement of heat radiating baffle plates between the muffle passes and the car tunnel by which heat will be directed upwardly and angularly toward the lower central region of the ware settings so that the ware disposed in the lower central regions of such settings will receive substantially the same degree of heat treatment by radiation as is obtained by ware disposed in other portions of such settings.

With these and other objects in view, which will appear as the description proceeds, the invention consists in the novel features of construction, combination of elements and arrangements of parts hereinafter fully described and pointed out in the appended claims.

In the accompanying drawings:

Fig. 1 is a horizontal sectional view taken through a kiln constructed in accordance with the present invention;

Fig. 2 is a vertical transverse sectional view taken through a high-fire section of the kiln on the plane indicated by the line II—II of Fig. 1;

Fig. 3 is a vertical longitudinal sectional view taken through the kiln on the plane indicated by the line III—III of Fig. 2;

Fig. 4 is a detail horizontal sectional view, the plane of the figure being indicated by the line IV—IV of Fig. 2;

Fig. 5 is a detail view in side elevation of the heat radiating panels comprising the present invention, the point of view of the figure being indicated by the line V—V of Fig. 2;

Fig. 6 is a detail transverse sectional view of a slightly modified form of the invention.

Referring more particularly to the drawings, the numeral 1 designates a tunnel kiln in its entirety. This kiln may be formed to provide the usual elongated wall structure shaped to produce a longitudinally extending tunnel 2, coextensive with the length of the kiln. Generally, the kiln includes a preheating section, indicated at A, a high-fire section B and a cooling section C. It will be understood that these sections or zones are not separated by sharp lines of demarcation but blend gradually one into the other. The green ware to be fired enters the kiln adjacent to the preheating section and emerges at the end of the cooling section. The kiln is thus in the form of a tunnel, having vertical side walls 3—3, a bottom 4 and an arched or flat roof 5. The material or ware to be heat treated passes through the tunnel on a suitable carrying means, such as a plurality of flat bottomed cars 6 and moves more or less continuously therethrough. The preheating and high-fire sections of the tunnel are, in the kiln illustrated, of greater width than the cooling section.

Starting in the high-fire section and continuing throughout that section and, also, throughout the preheating section to a position close to the charging end and on each side of the tunnel space required for the passage of ware, there is placed longitudinally aligned refractory plates in a substantially vertical position. Usually, the adjoining vertical edges of these plates will either abut or overlap, although the joints formed therebetween need not necessarily be gas tight, in the sense that neither cement nor mortar need be used in joining the baffle plates one with the other. These plates are indicated by the numeral 7 and are arranged on both sides of the ware tunnel to provide longitudinally extending combustion spaces 8 between said plates and the side walls 3, the bottom 4 and the roof 5 of the kiln. Highly heated gases, such as those obtained by the combustion of fuels, pass longitudinally through the spaces 8 from the high-fire to the preheating ends of the kiln, thereby heating the plates 7 and causing the latter to radiate heat onto the ware passing through the tunnel. These high temperature gases or products of combustion are preferably introduced into the spaces 8 by means of burners 9. These burners may be disposed in upper and lower rows, as shown in Figs. 1 and 2 and placed at an angle with respect to the longitudinal edges of the tunnel to promote the flow of the gases through the spaces 8 in the direction indicated by the arrows in Fig. 1. Preferably, the spaces 8 converge toward the preheating end of the kiln to increase somewhat the velocity of flow of said gases toward the preheating end of the kiln, from which they find escape through the stack outlets 10.

In order to effect the support of the heat radiating panels or plates 7, the bottom 4 of the kiln, adjacent to the car pit 11 is provided with ledge blocks 12, composed of a suitable refractory material. Supported by these ledge blocks and arranged in longitudinally aligned contiguous relationship are a plurality of ported blocks 13, having the horizontal configuration disclosed in Fig. 4. These blocks, therefore, provide bottom walls 14 of maximum area which rest directly upon the ledges 12, and with upper walls 15 of reduced area as compared with the bottom walls, the walls 14 and 15 being united by integral longitudinally spaced vertical posts 16. The upper surface of the bottom wall 14 of each block is grooved longitudinally contiguous to the inner edge thereof for the reception of the lower edges of supplemental heat radiating panels 17. These panels have their upper edges engaged with the vertical inner edges of the upper walls 15 so that by reason of the construction of the blocks 13, the panels 17 supported thereby will be disposed in angular relationship with respect to the vertical. It will be seen that the ported blocks 13 communicate freely on one side with the combustion spaces 8, and since the panels 17 are formed from a thin refractory material possessing high heat conductivity, the said panels will radiate heat at a high rate onto the ware supported in the tunnels by the cars 6. If desired, strips 18 of a refractory material similar to that used in the formation of the panels 17 may be employed to overlap the longitudinal meeting edges of the panels 17 to seal these meeting edge portions against the passage of combustion gases in any appreciable quantities therethrough.

The cars 6, which operate in the pit 11 are constructed to provide metallic truck frames 19 carrying track engaging wheels 20, the frames 19 being formed with depending plates 21 which are adapted to travel in troughs 22 provided in the bottom of said pit and containing sand or other similar heat sealing means. The upper portions of the frames 19 are equipped with the usual refractory beds 23, which support pier blocks 24 used in positioning the bottom deck 25 of the ware setting on said cars. The upper deck is designated by the numeral 26 and suitable supports 27 are arranged between said decks to maintain their vertical spaced order. The ware itself is designated by the numeral 28. By virtue of this arrangement, it will be observed that the supplemental panels 17 will be located below the lower deck 26, with the lower edges of the supplemental panels projecting under the deck 25. Due to the angular positions occupied by the supplemental panels, most of the heat liberated from the under surfaces thereof is directed toward the central region of the bottom deck 25 to heat the ware supported by said deck contiguous to that region.

The upper walls 15 of the blocks 13 are preferably grooved as at 29 for the reception of the lower row of panels or baffle plates 7. It will be understood that the latter may be disposed in superposed rows, extending from the blocks 12 to positioning grooves 30 formed in the under surface of the roof 5. The plates 7 are arranged one upon the other in vertical order and in abutting relationship in longitudinal order and are preferably formed from a thin refractory material such as carborundum, as are the plates 17. A variation of this structure has been disclosed in Fig. 6 wherein the panels 7a extend in one piece from the bottom 4 to the roof 5 of the kiln. In this form of the invention, the lower regions of the panels 7a are ported as at 31 to permit of the passage of heat directly therethrough and into contact with the supplemental panels 17a.

Arranged to rest directly on the refractory beds 23 of the cars, are blocks 32 which are provided with reversely inclined upper surfaces 33. These blocks are formed from a suitable heat insulating material and cooperate with the inclined plate 17 to direct and radiate heat upwardly and centrally of the ware mass positioned upon the cars.

What is claimed is:

1. In a continuous muffle kiln, a refractory wall structure formed to include a bottom, side walls and a top, said bottom being formed with a longitudinally extending car pit, imperforate heat conducting and radiating panels spaced from said side walls and extending from the bottom to the top of the kiln, and between which ware to be heat treated and supported on cars traveling through said pit is passed, the lower portions of said panels immediately above said bottom being of reduced thickness and sharply inclined with respect to the vertical and arranged in horizontal planes below that of the ware supported on said cars, the inclination of the inclined lower portions of said panels being such as to radiate heat toward the lower central portion of the ware disposed on said cars, and burner means communicating with the spaces formed between said side walls and said panels.

2. In a continuous muffle kiln, a heat confining structure including a bottom, spaced side walls and a roof, the bottom being formed with a centrally disposed longitudinally extending car pit, transversely spaced longitudinally extending imperforate heat radiating walls of relatively thin heat conducting material extending from said bottom from positions contiguous to said car pit to the roof of the heat confining structure and separating the latter interiorly into a pair of longitudinally extending combustion spaces and an intervening car tunnel, and cars movable through said pit and provided with a horizontally disposed deck for the reception of ware to be heat treated, the lower portions of said heat radiating walls being thinner than the upper portions and inclined with respect to the vertical to under-lie said deck, whereby heat radiated from the inclined portions of said last-named walls is directed upwardly toward the central lower regions of said decks.

3. In a tunnel kiln, a heat confining wall structure of refractory materials including a bottom, spaced side walls and a roof, the bottom being formed with a longitudinally extending car pit, a plurality of ported blocks positioned on said bottom contiguous to said pit, a plurality of longitudinally aligned vertically inclined heat radiating panels supported by said blocks between their upper and lower edge portions, and thin heat conducting and radiating walls supported by the upper edge portions of said blocks and said roof.

4. In a tunnel kiln, a heat confining structure of refractory materials including a bottom, side walls and a roof, the bottom having a longitudinally extending car pit formed centrally therein, ported blocks supported by said bottom in longitudinal rows contiguous to both sides of said pit, a plurality of superposed rows of heat radiating panels spaced from the side walls of said kiln and extending from the upper surfaces of said blocks to said roof, and supplemental heat radiating panels arranged in angular relationship with respect to the first-named panels and supported on opposite sides of said tunnel between the upper and lower edges of the ported blocks.

5. In a tunnel kiln, a heat confining structure of refractory material including a bottom, side walls and a roof, said bottom being formed with a longitudinally extending car pit, removable walls of a heat conducting and radiating material spaced from said side walls and extending from said bottom contiguous to the opposite sides of said car pit to said roof, the lower portions of said last named walls being reduced in thickness and sharply inclined with respect to the vertical to under lie ware supported on cars travelling through the car pit.

6. In a tunnel kiln, a heat confining structure of refractory materials including a bottom, side walls and a roof, the bottom having a longitudinally extending car pit formed therein, ware-supporting cars movable lengthwise of said pit, said cars being provided with refractory bodies, means for supporting the ware to be heat treated in the kiln from and in spaced superposed relationship with respect to said bodies, reversely inclined blocks of heat resisting material arranged on the bodies of said cars below the ware, a plurality of longitudinally aligned heat radiating panels supported between the bottom and roof of the heat confining structure and spaced from the side walls thereof, means for passing heated gases through the spaces provided between said panels and said side walls, the lower portions of said panels being arranged at an angle with respect to the vertical to direct heat radiating therefrom in an upward direction toward the central lower area of the ware positioned on said cars.

7. In a tunnel kiln, a heat confining structure of refractory material including a bottom, side walls and a roof, said bottom being formed with a longitudinally extending car pit, walls of a heat conducting and radiating material spaced from said side walls and extending from said bottom contiguous to the opposite sides of said car pit to said roof, the lower portions of said last named walls being reduced in thickness and offset with respect to the upper portion of the wall to underlie ware supported on cars traveling through the car pit.

8. In a muffle kiln, a heat confining structure of refractory material including a bottom, side walls and a roof, said bottom being formed with a longitudinally extending car pit, substantially vertically extending heat conducting and radiating plates spaced from the side walls and bottom walls, and downwardly and inwardly inclined panels arranged between said plates and said bottom.

9. In a muffle kiln, a heat confining structure of refractory material including a bottom, side walls and a roof, said bottom being formed with a longitudinally extending car pit, heat conducting and radiating plates spaced from the side walls and extending from the roof downwardly to a point spaced from the bottom of the kiln, and thin panels provided to bridge the space between the lower ends of the plates and the bottom.

10. In a muffle kiln, a heat confining structure including a bottom, side walls and a roof, said bottom being formed with a longitudinally extending car pit, vertically extending heat conducting and radiating plates spaced from said side walls and engaging said bottom and roof to provide a combustion chamber on either side of said car pit, and thin downwardly and inwardly inclined panels offset with respect to said plates and directly contacted by the products of combustion in said chambers.

11. In a muffle kiln, a heat confining structure including a roof, side walls and a bottom, said bottom being formed with a longitudinally extending car pit, heat conducting and radiating plates arranged between said bottom and roof and spaced from said side walls to provide a combustion chamber on either side of said car pit, and thin inclined panels arranged at the edge of said car pit and directly contacted by the gases of combustion in said chambers.

12. In a muffle kiln, a heat confining structure including a roof, side walls and a bottom, said bottom being formed with a longitudinally extending car pit, baffle plates of heat conducting and radiating material extending between said bottom and roof and spaced from said side walls to form a combustion chamber on either side of said car pit, said baffle plates being formed with openings near their lower edges, and thin inclined panels arranged between said plates and the edge of said car pit and covering said openings to prevent escape of combustion products from said chambers.

FRANK M. HARTFORD.